(12) United States Patent
Chinnakonda et al.

(10) Patent No.: US 6,249,862 B1
(45) Date of Patent: Jun. 19, 2001

(54) DEPENDENCY TABLE FOR REDUCING DEPENDENCY CHECKING HARDWARE

(75) Inventors: Muralidharan S. Chinnakonda; Thang M. Tran; Wade A. Walker, all of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/715,467

(22) Filed: Nov. 15, 2000

Related U.S. Application Data

(62) Division of application No. 09/566,216, filed on May 5, 2000, now Pat. No. 6,209,004, which is a division of application No. 08/649,247, filed on May 17, 1996, now Pat. No. 6,108,769.

(51) Int. Cl.[7] .................................................. G06F 9/38
(52) U.S. Cl. ................................................ 712/218; 712/23
(58) Field of Search .................................... 712/215, 216, 712/217, 219, 23, 218

(56) References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,394,351 | 2/1995 | Widigen et al. . |

(List continued on next page.)

FOREIGN PATENT DOCUMENTS

| | | |
|---|---|---|
| 0259095 | 3/1988 | (EP) . |
| 0381471 | 8/1990 | (EP) . |

(List continued on next page.)

OTHER PUBLICATIONS

A 56–Entry Instruction Reorder Buffer, pp. 1–3; IEEE 2/96.*

(List continued on next page.)

*Primary Examiner*—Larry D. Donaghue
(74) *Attorney, Agent, or Firm*—Conley, Rose & Tayon, PC; Lawrence J. Merkel

(57) ABSTRACT

A dependency table stores a reorder buffer tag for each register. The stored reorder buffer tag corresponds to the last of the instructions within the reorder buffer (in program order) to update the register. Otherwise, the dependency table indicates that the value stored in the register is valid. When operand fetch is performed for a set of concurrently decoded instructions, dependency checking is performed including checking for dependencies between the set of concurrently decoded instructions as well as accessing the dependency table to select the reorder buffer tag stored therein. Either the reorder buffer tag of one of the concurrently decoded instructions, the reorder buffer tag stored in the dependency table, the instruction result corresponding to the stored reorder buffer tag, or the value from the register itself is forwarded as the source operand for the instruction. Information from the comparators and the information stored in the dependency table is sufficient to select which value is forwarded. Additionally, the dependency table stores the width of the register being updated. Prior to forwarding the reorder buffer tag stored within the dependency table, the width stored therein is compared to the width of the source operand being requested. If a narrow-to-wide dependency is detected the instruction is stalled until the instruction indicated in the dependency table retires. Still further, the dependency table recovers from branch mispredictions and exceptions by redispatching the instructions into the dependency table.

4 Claims, 10 Drawing Sheets

U.S. PATENT DOCUMENTS

| | | |
|---|---|---|
| 5,446,912 | 8/1995 | Colwell et al. . |
| 5,497,499 | 3/1996 | Garg et al. . |
| 5,590,295 | 12/1996 | Dessaran et al. . |
| 5,590,352 | 12/1996 | Zuraski et al. . |
| 5,630,149 | 5/1997 | Bluhm . |
| 5,651,125 | 7/1997 | Witt et al. . |
| 5,765,016 | 6/1998 | Walker . |
| 5,765,035 | 6/1998 | Tran . |
| 5,768,555 | 6/1998 | Tran et al. . |
| 5,870,580 | 2/1999 | Walker . |
| 5,872,951 | 2/1999 | Tran . |
| 5,878,244 | 3/1999 | Witt et al. . |
| 5,881,305 | 3/1999 | Walker . |
| 5,901,302 | 5/1999 | Witt et al. . |
| 5,903,740 | 5/1999 | Walker et al. . |
| 5,903,741 | 5/1999 | Witt et al. . |
| 5,922,069 | 7/1999 | Walker . |
| 5,944,812 | 8/1999 | Walker . |
| 5,961,634 | 10/1999 | Tran . |
| 5,983,342 | 11/1999 | Tran . |
| 5,987,596 | 11/1999 | Walker . |
| 6,026,482 | 2/2000 | Witt et al. . |
| 6,032,251 | 2/2000 | Tran et al. . |
| 6,134,651 | 10/2000 | Witt et al. . |

FOREIGN PATENT DOCUMENTS

| | | |
|---|---|---|
| 0459232 | 12/1991 | (EP) . |
| 0 612 012 A1 | 8/1994 | (EP) . |
| 0 614 138 A1 | 9/1994 | (EP) . |
| 2263985 | 8/1993 | (GB) . |
| 2263987 | 8/1993 | (GB) . |
| 2281422 | 3/1995 | (GB) . |
| WO 93/20505 | 10/1993 | (WO) . |
| WO 94/16384 | 7/1994 | (WO) . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Design and Implementation of 100 MHZ Reorder Buffer; 1995.

* cited by examiner-

| Reg. | Tag | Width | Valid |
|---|---|---|---|
| EAX | 10 | 011 | 1 |
| EBX | 11 | 111 | 1 |
| ECX | — | — | 0 |
| EDX | 12 | 111 | 1 |

210

214A → ADD AX, BX ⟶ ADD 10,11 ～ 218A
214B → ADD ECX, EDX ⟶ ADD ECX,12 ～ 218B
214C → ADD ECX, ECX ⟶ ADD 21,21 ～ 218C

---

| Reg. | Tag | Width | Valid |
|---|---|---|---|
| EAX | 20 | 011 | 1 |
| EBX | 11 | 111 | 1 |
| ECX | 22 | 111 | 1 |
| EDX | 12 | 111 | 1 |

212

216A → ADD EAX, EBX ⟶ Stall
216B → INS1
216C → INS2

Fig. 10

DEPENDENCY TABLE FOR REDUCING DEPENDENCY CHECKING HARDWARE

This application is a Divisional of U.S. patent application Ser. No. 09/566,216, filed May 5, 2000 now U.S. Pat. No. 6,209,004, which is a Divisional of U.S. patent application Ser. No. 08/649,247, filed May 17, 1996 now U.S. Pat. No. 6,108,769, (which includes a continued prosecution application filed Jul. 1, 1998).

BACKGROUND OF THE INVENTION

1. Field of the Invention

This invention is related to the field of microprocessors and, more particularly, to dependency checking mechanisms within microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ out of order execution. The instructions within a program are ordered, such that a first instruction is intended to be executed before a second instruction, etc. When the instructions are executed in the order specified, the intended functionality of the program is realized. However, instructions may be executed in any order as long as the original functionality is maintained. For example, a second instruction which does not depend upon a first instruction may be executed prior to the first instruction, even if the first instruction is prior to the second instruction in program order. A second instruction depends upon a first instruction if a result produced by the first instruction is employed as an operand of the second instruction. The second instruction is said to have a dependency upon the first instruction.

Another hazard of out of order execution occurs when two instructions update the same destination storage location. If the instruction which is second in the original program sequence executes first, then that instruction must not update the destination until the first instruction has executed. Often, superscalar microprocessors employ a reorder buffer in order to correctly handle multiple updates to a destination, among other things. Instructions are stored into the reorder buffer in program order, typically as the instructions are dispatched to execution units (perhaps being stored in reservation stations associated therewith). The results of the instructions are stored into the destinations from the reorder buffer in program order. However, results may be provided to the reorder buffer in any order. The reorder buffer stores each result with the instruction which generated the result until that instruction is selected for storing its result into the destination.

A reorder buffer is configured to store a finite number of instructions, defining a maximum number of instructions which may be concurrently outstanding within the superscalar microprocessor. Generally speaking, out of order execution occurs more frequently as the finite number is increased. For example, the execution of an instruction which is foremost within the reorder buffer in program order may be delayed. Instructions subsequently dispatched into the reorder buffer which are not dependent upon the delayed instruction may execute and store results in the buffer. Out of order execution may continue until the reorder buffer becomes full, at which point dispatch is suspended until instructions are deleted from the reorder buffer. Therefore, a larger number of storage locations within the reorder buffer generally leads to increased performance by allowing more instructions to be outstanding before instruction dispatch (and out of order execution) stalls.

Unfortunately, larger reorder buffers complicate dependency checking. One or more source operands of an instruction to be dispatched may be destination operands of outstanding instructions within the reorder buffer. As used herein, a source operand of an instruction is a value to be operated upon by the instruction in order to produce a result. Conversely, a destination operand is the result of the instruction. An instruction specifies the location storing the source operands and the location in which to store the destination operand. An operand may be stored in a register (a "register operand") or a memory location (a "memory operand"). As used herein, a register is a storage location included within the microprocessor which is used to store instruction results. Registers may be specified as source or destination storage locations for an instruction. The registers may be defined by the microprocessor architecture or specified by the particular microprocessor implementation.

The locations from which to retrieve source operands for an instruction to be dispatched are compared to the locations designated for storing destination operands of instructions stored within the reorder buffer. If a dependency is detected and the corresponding instruction has executed, the result stored in the reorder buffer may be forwarded for use by the dispatching instruction. If the instruction has not yet executed, a tag identifying the instruction may be forwarded such that the result may be provided when the instruction is executed.

When the number of instructions storable in the reorder buffer is large, the number of comparisons for performing dependency checking is also large. Generally speaking, the total number of comparisons which must be provided for is the number of possible operands of an instruction multiplied by the number of instructions which may be concurrently dispatched, further multiplied by the number of instructions which may be stored in the reorder buffer. As the number of instructions increases, the amount of circuitry employed to perform the comparisons increases dramatically. The large amount of circuitry may undesirably increase the total amount of circuitry employed by the microprocessor. Additionally, more than one destination operand within the reorder buffer may be stored within the storage location indicated for a source operand. Circuitry is therefore employed to detect the last of the destination operands indicated by the comparisons, in order to correctly detect the dependency (i.e. the instruction which stores a result into a storage location used for a source operand and which is nearest to the dispatching instruction in program order is the instruction upon which the dispatching instruction depends). It is therefore desirable to reduce the complexity of dependency checking for reorder buffers.

SUMMARY OF THE INVENTION

The problems outlined above are in large part solved by a dependency checking apparatus in accordance with the present invention. The apparatus includes a dependency table which stores a reorder buffer tag for each register. The stored reorder buffer tag corresponds to the last instruction (in program order) to update the register. The last instruction to update the register is one of the instructions within a reorder buffer employed by the microprocessor. Otherwise, the dependency table indicates that the value stored in the register is valid. When operand fetch is performed for a set of concurrently decoded instructions, dependency checking is performed for the set of instructions. Dependency checking includes checking for dependencies between the set of concurrently decoded instructions, as well as accessing the dependency table to select the reorder buffer tag stored therein. Either the reorder buffer tag of one of the concurrently decoded instructions, the reorder buffer tag stored in the dependency table, the instruction result corresponding to the stored reorder buffer tag, or the value from the register itself is forwarded as the source operand for the instruction. Information from the comparators and the information stored in the dependency table is sufficient to select which value is forwarded. Advantageously, the number of comparators used for dependency checking is reduced to the number of comparators used to perform dependency checking between the set of instructions. Importantly, the number of comparators is independent of the number of storage locations within the reorder buffer. The amount of hardware employed for dependency checking is essentially constant for any number of storage locations within the reorder buffer.

Additionally, the dependency table stores the width of the register being updated. Prior to forwarding the reorder buffer tag stored within the dependency table, the width stored therein is compared to the width of the source operand being requested. If a narrow-to-wide dependency is detected (i.e. the source operand requires a larger portion of the register than the portion being updated as indicated in the dependency table), the instruction is stalled until the instruction indicated in the dependency table retires. The source operand may then be accessed from the register itself.

Still further, the dependency table recovers from branch mispredictions and exceptions. When such a situation occurs, instructions within the reorder buffer which are prior to the mispredicted or exception-causing instructions are redispatched into the dependency table. In this manner, the dependency table acquires a state indicative of the instructions outstanding prior to the mispredicted or exception-causing instruction. In other words, the effect of the discarded instructions subsequent to the mispredicted or exception-causing instruction in the reorder buffer is removed from the dependency table.

Broadly speaking, the present invention contemplates an apparatus for performing dependency checking in a superscalar microprocessor comprising a dependency table and a control unit. The dependency table includes a storage location for storing dependency information regarding a register, including a first tag identifying an instruction which updates at least a portion of the register and a width identifying the portion of the register. The control unit is configured to detect dependencies between a set of concurrently decoded instructions and to assign a second tag for each source operand within the set of instructions. The second tag identifies one of the set of concurrently decoded instructions if the control unit detects an update of the source operand by one of the set of instructions. Alternatively, the second tag is equal to the first tag if the first tag is stored in the dependency table and the source operand is the register.

The present invention further contemplates a method for performing dependency checking in a superscalar microprocessor. A first tag indicating an instruction which updates at least a portion of a register is stored into a dependency table. Additionally, a width indicative of the portion is stored. Source operands corresponding to a set of concurrently decoded instructions are conveyed to the dependency table. A set of second tags are assigned to the source operands, wherein one of the set of second tags is equal to the first tag if a corresponding one of the source operands is stored in the register.

The present invention still further contemplates a superscalar microprocessor comprising first and second decode units, first and second reservation stations, and a reorder buffer. The first decode unit is configured to decode a first instruction and to convey a first source operand to a reorder buffer. The first source operand is identified by the first instruction. Similarly, the second decode unit is configured to decode a second instruction and to convey a second source operand to the reorder buffer. The second source operand is identified by the second instruction. The first decode unit and the second decode unit operate concurrently. Coupled to the first decode unit and the second decode unit, the reorder buffer is configured to receive the first and second source operands and is configured to assign tags to the first and second source operands. The tags are assigned according to the dependency information stored in a dependency table included within the reorder buffer. The dependency information includes a set of tags and a set of widths, wherein the reorder buffer assigns a first one of the set of tags to the first source operand if the first source operand identifies a first register corresponding to the first one of the set of tags. Additionally, the first tag is assigned to the first source operand if the first source operand accesses a second portion of the first register included within a first portion of the first register. The first portion of the first register is identified by a first one of the set of widths, wherein the first one of the set of widths corresponds to the first one of the set of tags. Similarly, a second one of the set of tags is assigned to the second source operand. The first reservation station is coupled to receive the first one of the set of tags assigned to the first source operand. Similarly, the second reservation station is coupled to receive the second one of the set of tags assigned to the second source operand.

BRIEF DESCRIPTION OF THE DRAWINGS

Other objects and advantages of the invention will become apparent upon reading the following detailed description and upon reference to the accompanying drawings in which:

FIG. 10 is an example of the operation of one embodiment of the dependency table shown in FIG. 4.

Figure 1:
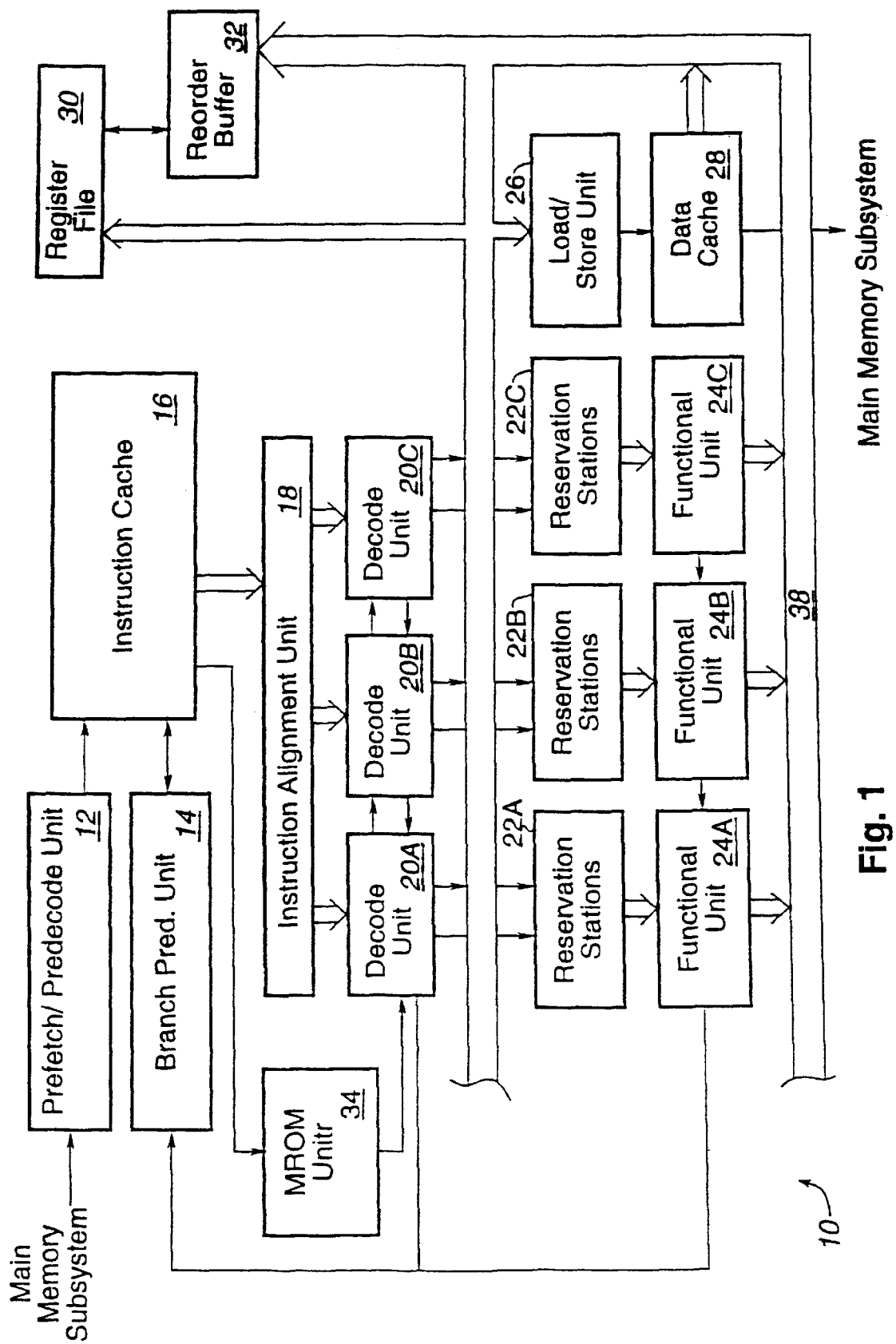
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, reorder buffer 32 is configured to perform dependency checking upon instructions being dispatched by microprocessor 10. As used herein, an instruction is dispatched when it is released for out of order execution within a microprocessor. Prior to dispatch, an instruction remains in the original program order with the instructions around it. For microprocessor 10, an instruction is dispatched when it is recorded in reorder buffer 32. Subsequent to recordation in reorder buffer 32, out of order execution of the instruction may commence.

Reorder buffer 32 includes a dependency table. The dependency table identifies, for each register within microprocessor 10, the reorder buffer storage location which is storing the last of the instructions within reorder buffer 32 (in program order) to update the register. In other words, the table identifies the last instruction having the register as the destination. Instead of comparing the source register operands to the destinations of the instructions within reorder buffer 32 and prioritizing the results by instruction order, reorder buffer 32 simply reads the dependency table entry for the source operand to determine the appropriate storage location within reorder buffer 32. As a set of instructions are entered into reorder buffer 32 during a clock cycle, the registers which are destinations of the set of instructions are updated to indicate reorder buffer storage locations of the instructions within the set. Advantageously, a significantly less complex dependency check is performed. For cases in which the number of comparators would have been large, the table may require less circuitry than the comparators. Still further, the amount of dependency checking hardware is determined by the number of concurrently decoded instructions and the number of registers within register file 30. Therefore, the number of instructions which may be outstanding within microprocessor 10 (e.g. the number of reorder buffer storage locations) may be arbitrarily increased without adding additional dependency checking hardware. In other words, the dependency checking hardware remains constant regardless of the number of reorder buffer storage locations included.

For embodiments of microprocessor 10 employing the x86 microprocessor architecture, the dependency table within reorder buffer 32 additionally stores the width of the register being updated. The x86 microprocessor architecture defines instructions which access and perform updates to a portion of a register, as opposed to updating the entire register. For example, an instruction may update the EAX register (32 bits wide), the AX register (the 16 least significant bits of the EAX register), the AH register (the 8 most significant bits of the AX register), or the AL register (the 8 least significant bits of the AX register) Generally speaking, the width of a register identifies the portion of the register being updated by a particular instruction. Therefore, dependency checking involves not only detecting the instruction which updates the register but also the extent of the update as compared to the extent of the source operand. A narrow-to-wide dependency exists if an instruction updates a portion of a register, and a subsequent instruction accesses that portion as well as an additional portion of the register. On the other hand, a wide-to-narrow dependency exists is if an instruction updates a portion of a register and a subsequent instruction accesses a portion of that portion. Wide-to-narrow dependencies may be handled as if the entire register is updated (i.e. the result generated by the instruction may be forwarded to the subsequent instruction). Narrow-to-wide dependencies are more complicated, in that the result forwarded by the instruction is insufficient for supplying the operand of the subsequent instruction.

Reorder buffer 32 occasionally discards instructions due to branch mispredictions and exceptions. When such activities occur, the dependency table information may become invalid since instructions represented therein may have been discarded. Therefore, reorder buffer 32 clears the information from the dependency table and initiates branch recovery activity. In one embodiment, reorder buffer 32 scans through the instructions which remain within reorder buffer 32 after discarding the affected instructions. The instructions are conveyed through the logic used to update the dependency table with instructions being dispatched. Therefore, minimal additional circuitry is employed for selecting groups of instructions to route through the dispatch logic.

It is noted that the dependency checking performed by reorder buffer 32 detects register dependencies. Memory operand dependencies are detected and handled by load/store unit 26.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| Start bits | 10000 |
|---|---|
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch Prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ES?). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring"

the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
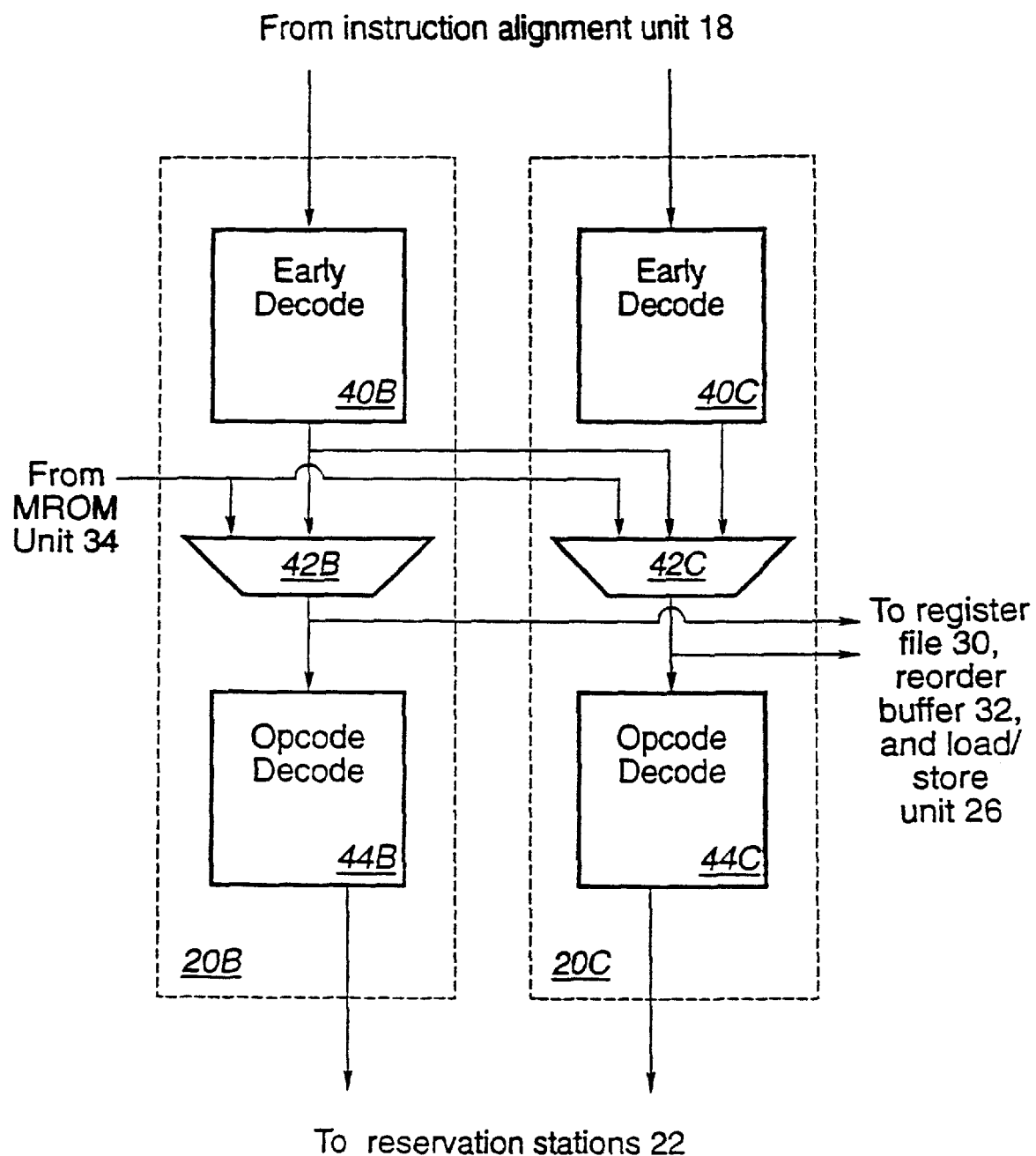
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform.

Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
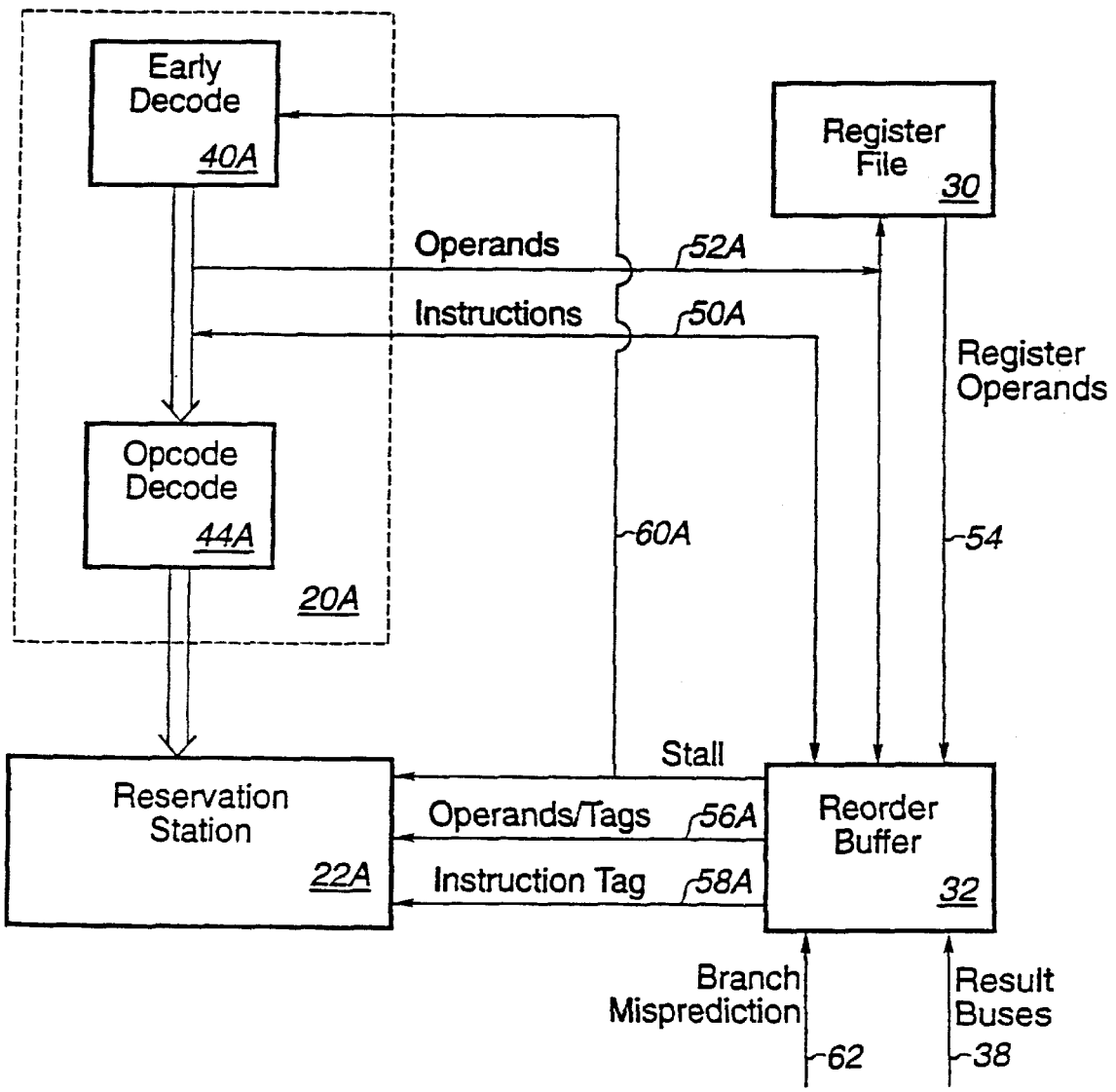
FIG. 3 is a block diagram of one embodiment of a decode unit, a register file, a reorder buffer, and a reservation station shown in FIG. 1, highlighting interconnection between the units.

Turning now to FIG. 3, a block diagram depicting decode unit 20A, reservation station 22A, reorder buffer 32, and register file 30 is shown to highlight interconnections between these units in accordance with one embodiment of microprocessor 10. Decode units 20B–20C and reservation stations 22B–22C may include similar interconnections with register file 30 and reorder buffer 32. Decode unit 20A includes an early decode unit 40A and an opcode decode unit 44A similar to decode units 20B–20C shown in FIG. 2. It is noted that dissimilar interconnections may be employed in other embodiments. Additional interconnection may further be employed for other functionality.

Early decode unit 40A receives an instruction from instruction alignment unit 18 (not shown). The instruction is subsequently conveyed to opcode decode unit 44A as described above. Additionally, certain instruction information regarding the instruction is conveyed to reorder buffer 32 upon an instruction bus 50A. The instruction information conveyed is information used by reorder buffer 32 during subsequent instruction handling. Instruction information stored by reorder buffer 32 in one embodiment of reorder buffer 32 is described in more detail below. It is noted that reorder buffer 32 may be referred to herein as storing an instruction. In fact, the complete instruction may not be stored. Instead, instruction information sufficient for reorder buffer 32 to carry out its operations is stored.

Early decode unit 40A further conveys indications of the operands identified by the instructions upon an operands bus 52A. Register identifiers are conveyed, as well as a validity indication for each operand and a width value indicating which portions of the register are accessed or updated by the operand. For the embodiment of microprocessor 10 shown in FIGS. 1 and 2, up to two register operands may be used by an instruction transferred to a decode unit 20. X86 instructions which use more than two register values are classified as either double dispatch or MROM instructions. Operands bus 52A is coupled to both register file 30 and reorder buffer 32. Register operands as stored in register file 30 are conveyed to reorder buffer 32 in response to the register identifiers conveyed upon operands bus 52A. Register file 30 employs a register operands bus 54 for transmitting register operands to reorder buffer 30. If reorder buffer 32 is not storing an instruction which updates one of the registers identified as a source operand, then the corresponding register operand value conveyed upon register operands bus 54 is forwarded for use by the instruction corresponding to the source operand.

Alternatively, reorder buffer 32 may be storing an instruction which updates a register identified upon operands bus 52A. In this case, the corresponding value provided by register file 30 is ignored. Instead, the value generated by the instruction identified by the dependency table entry corresponding to the register is provided. If the instruction identified by the dependency table entry has not yet executed, then the reorder buffer tag corresponding to the instruction is provided in lieu of the operand. When the instruction executes, the operand value may be captured from result buses 38.

Reorder buffer 32 conveys an operand value or reorder buffer tag in accordance with the above upon operands/tags bus 56A to reservation station 22A. Reservation station 22A associates the operand value or reorder buffer tag with the instruction conveyed from decode unit 20A. Additionally, a reorder buffer tag corresponding to the instruction received by reservation station 22A is conveyed by reorder buffer 32 upon instruction tag bus 58A. The instruction tag identifies the reorder buffer storage location assigned to the instruction received by reservation station 22A. The instruction tag is used to forward the result of the instruction upon result buses 38 when the instruction is executed. In one embodiment, reorder buffer 32 is line-oriented and the instruction tag comprises the line tag assigned to the group of concurrently decoded instructions which includes the instruction. Each of the other reservation stations 22 receives the line tag as well. The offset tag for each issue position is a constant inherent in the issue position, and therefore need not be conveyed.

For example, reservation station 22A is included within issue position zero. Therefore, offset tags of instructions received by reservation station 22A are always zero.

A stall signal 60A is coupled between reorder buffer 32 and reservation station 22A, opcode decode unit 44A, and early decode unit 40A. Reorder buffer 32 asserts stall signal 60A when instruction decode and dispatch is to be held. Reorder buffer 32 may assert stall signal 60A when reorder buffer 32 is full, until instructions are retired and release storage locations for new instructions. Additionally, reorder buffer 32 may assert stall signal 60A if instructions being dispatched subsequent to a mispredicted branch instruction arrive at reorder buffer 32 prior to completion of branch misprediction recovery. Other stall conditions may be generated as well, according to various embodiments.

Finally, a branch misprediction bus 62 and results buses 38 are coupled to reorder buffer 32. Results buses 38 convey instruction execution results and corresponding reorder buffer tags to reorder buffer 32 for storage. Branch misprediction bus 62 conveys an indication of a mispredicted branch. The indication includes a reorder buffer tag identifying the mispredicted branch instruction within reorder buffer 32. Upon receiving a mispredicted branch indication, reorder buffer 32 begins mispredicted branch recovery operations. It is noted that exceptions may be indicated via branch misprediction bus 62 as well, or a separate bus may be used. Branch misprediction bus 62 may originate in branch prediction unit 14 or functional units 24, according to various embodiments.

Figure 4:
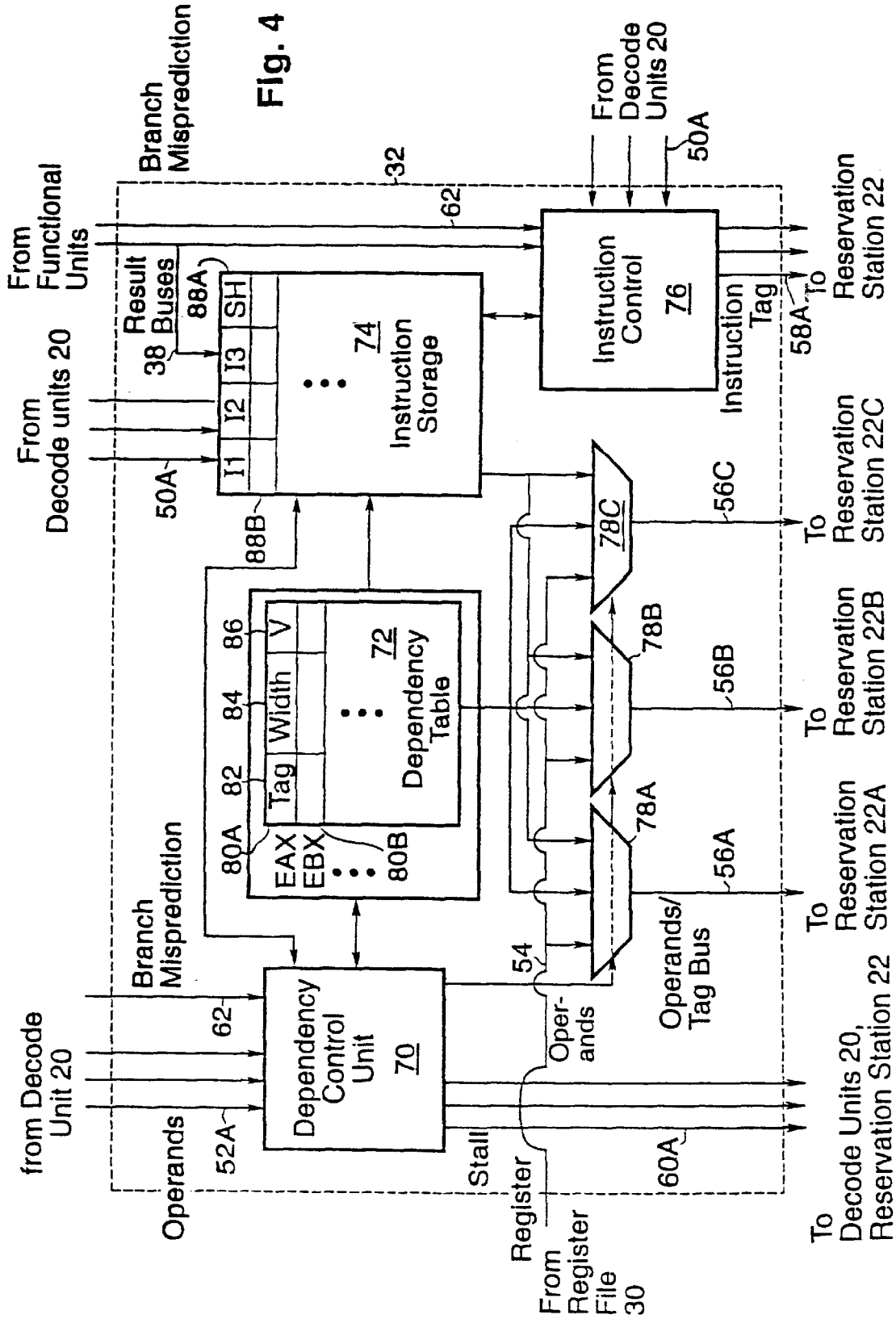
FIG. 4 is a block diagram of one embodiment of the reorder buffer shown in FIG. 1.

Turning now to FIG. 4, a block diagram of one embodiment of reorder buffer 32 is shown. Other embodiments of reorder buffer 32 are contemplated. As shown in FIG. 4, reorder buffer 32 includes a dependency control unit 70, a dependency table 72, an instruction storage 74, an instruction control unit 76, and a plurality of multiplexors 78A–78C. Dependency control unit 70 is coupled to operands buses 52 (including operands bus 52A from decode unit 20A), branch misprediction bus 62, stall signals 60 (including stall signal 60A coupled to decode unit 20A and reservation station 22A), dependency table 72, instruction storage 74, and multiplexors 78. Dependency table 72 is further coupled to instruction storage 74 and multiplexors 78. Instruction storage 74 is coupled to instruction buses 50 (including instruction bus 50A from decode unit 20A), result buses 38, instruction control unit 76, and multiplexors 78. Instruction control unit 76 is further coupled to branch misprediction bus 62, instruction buses 50, and instruction tag buses 58 (including instruction tag bus 58A coupled to reservation station 22A). Finally, multiplexors 78 are coupled to register operands bus 54 and to operands/tags buses 56 (including operands/tags bus 56A coupled to reservation station 22A). Dependency table 72 includes a plurality of storage locations (or entries) including storage locations 80A and 80B. Additionally, instruction storage 74 includes a plurality of instruction storage locations including instruction storage locations 88A and 88B.

Dependency control unit 70 receives register operand identifiers for both source and destination operands upon operands buses 52. Dependency control unit 70 performs dependency checking upon the source operands. Particularly, dependency control unit 70 compares each source operand to the destination operands of concurrently decoded instructions which are prior (in program order) to the instruction corresponding to that source operand. For the embodiment of microprocessor 10 shown in FIG. 1, the source operands for the instruction in decode unit 20B are compared to the destination operand of the instruction in decode unit 20A. Similarly, the source operands for the instruction in decode unit 20C are compared to the destination operands of the instructions in decode units 20A–20B. In this manner, dependencies between a set of concurrently decoded instructions are detected. If such a dependency is detected, the reorder buffer tag assigned to the instruction upon which a source operand depends is conveyed upon the operands/tags bus 56 for the dependent instruction.

If no dependencies upon concurrently decoded instructions are detected for a source operand, then operands are selected and routed via the information stored in dependency table 72. Dependency control unit 70 reads the dependency table entry for each source operand received upon operands bus 52. A dependency table storage location 80 is assigned to each register within register file 30. For example, storage location 80A is assigned to the EAX register. Similarly, storage location 80B is assigned to the EBX register.

Storage locations 80 include several fields of information. A tag field 82, a width field 84, and a valid field 86 are shown in FIG. 4. Tag field 82 stores the reorder buffer tag of the last instruction (in program order) within reorder buffer 32 which updates the register. Width field 84 stores a value indicating which portions of the register are updated by the last instruction, in order to perform width dependency checking. Finally, valid field 86 indicates the validity of the dependency table entry. Valid field 86 may comprise a bit indicative, when set, that the dependency table entry is valid. When clear, the bit indicates that register file 30 is storing the operand value corresponding to the register. It is noted that valid field 86 may not be included in certain embodiments. Instead, width field 84 may include an encoding which indicates that register file 30 is storing the operand value corresponding to the register.

Dependency control unit 70 examines the validity of the dependency table entry. If the entry is valid, then dependency control unit 70 examines the instruction storage location 88 indicated by tag field 82. If the corresponding instruction has provided a result to instruction storage 74, the result is provided upon operands/tags bus 56. Alternatively, the tag from tag field 82 is provided if the corresponding instruction has not yet provided a result. If the dependency table entry is invalid, then dependency control unit 70 provides the value stored in register file 30 (conveyed upon register operands bus 54) upon operands/tags bus 56. It is noted that each operands/tags bus 56 may comprise separate conductors for conveying a tag value and for conveying a data value corresponding to a particular source operand.

In summary, dependency control unit 70 provides one of the following for each source operand upon operands/tags bus 56 according to the embodiment shown in FIG. 4: (i) a reorder buffer tag of an instruction concurrently decoded with the instruction corresponding to the source operand; (ii) a reorder buffer tag of a previously decoded and dispatched instruction; (iii) a speculative result generated by the previously decoded and dispatched instruction; or (iv) the value from register file 30. Dependency control unit 70 generates selection controls for multiplexors 78 in order to provide one of the values. The reorder buffer tag of the concurrently decoded instruction and the result of the previously decoded instruction are provided by instruction storage 74 to multiplexors 78. Instruction storage 74 includes multiple read ports for use by dependency control unit 70. Each read port is used to read an instruction storage location corresponding to one of the source operands for which dependency checking is being performed. The reorder buffer tag of the previous instruction is provided by dependency table 72, and the value from register file 30 is provided upon register operands bus 54 to multiplexors 78. Similar to instruction storage 74, dependency table 72 includes a read port for each source operand concurrently processed by dependency control unit 70.

As opposed to comparing a source operand to each destination operand stored in instruction storage 74, dependency control unit 70 performs comparisons of the source operand to destination operands of concurrently decoded instructions. A small number of comparator circuits may therefore be included (e.g. three comparator circuits per source operand in the embodiment of microprocessor 10 shown in FIG. 1). Dependency checking for the source operand is completed by checking the validity of a dependency table entry and the validity of a result in an instruction storage location. The resulting circuitry may be significantly less complex and area-intensive than the corresponding large number of comparators. Advantageously, dependency checking circuitry may be reduced. The number of comparators employed by dependency control unit 70 is dependent upon the number of concurrently decodable or dispatchable instructions. Particularly, the number of comparators is independent of the number of instructions which may be stored in instruction storage 74.

Dependency control unit 70 updates dependency table 72 according to the destinations specified upon operands buses 52. The reorder buffer tag (i.e. the line tag and the offset tag) corresponding to each instruction is stored into the dependency table entry assigned to the destination register indicated by that instruction. If more than one instruction within a set of concurrently decoded instructions updates a particular register, the reorder buffer tag of the last instruction (in program order) to update the register is stored into dependency table 72. Additionally, dependency control unit 70 stores the width received upon operands bus 52 into dependency table 70.

Dependency control unit 70 further updates dependency table 72 according to the instructions being retired during a clock cycle. Dependency control unit 70 searches dependency table 72 for reorder buffer tags corresponding to instructions being retired. In one embodiment, dependency control unit 70 receives the line tag from the shared field SH of the instruction storage location 88 forming the bottom of instruction storage 74. When instruction control unit 76 indicates that the line is being retired, dependency control unit 70 compares the line tag of the tags in tag fields 82 to the line tag provided by instruction storage 74 and invalidates those entries for which a match is detected. The entries are invalidated to indicate that the operand value is stored in register file 30.

Prior to routing the speculative operand value stored in instruction storage 74 or the reorder buffer tag stored in dependency table 72, dependency control unit 70 determines narrow-to-wide dependencies by examining the width field 84 and the width of the source operand. If a narrow-to-wide dependency is detected, the instruction corresponding to the source operand and subsequent instructions (in program order) are stalled via assertion of corresponding stall signals 60. The stall signals 60 remain asserted until the corresponding dependency table entry is invalidated (either via branch misprediction or retirement of the corresponding instruction).

When microprocessor 10 mispredicts a branch instruction, dependency table 72 is invalid. Dependency control unit 70 receives branch misprediction bus 62 in order to detect mispredicted branches. Upon receipt of a branch misprediction indication, dependency control unit 70 clears the validity indication of each entry 80 within dependency table 72. Subsequently, dependency control unit 70 scans each line of instructions within instruction storage 74. The source and destination operands and corresponding widths stored therein are routed through the logic circuits used to perform dependency checking upon values received upon operands buses 52. Effectively, the instructions are redispatched into dependency table 72. Dependency control unit 70 continues reading subsequent lines of instructions until the line including the mispredicted branch instruction is discovered. Instructions within the line including the mispredicted branch instruction which are prior to the mispredicted branch instruction in program order are redispatched into dependency table 72 as well. In this manner, dependency table 72 is restored to a state consistent with the mispredicted branch instruction. Instructions from the correct path thereby receive dependency checking only with those instructions prior to the mispredicted branch instruction.

When a mispredicted branch instruction is detected, instruction cache 16 begins fetching instructions according to the correct path indicated by executing the mispredicted branch instruction (i.e. if the mispredicted branch was predicted taken, the not taken path is fetched and vice-versa). Depending upon the number of instruction processing pipeline stages employed by microprocessor 10 and the number of lines of instructions within instruction storage 74 which are prior to the mispredicted branch instruction, operands corresponding to instructions from the correct path may arrive upon operands bus 52 prior to completion of branch misprediction recovery. Dependency control unit 70 detects such a situation and asserts stall signals 60. The instructions are thereby stalled in early decode units 40 until branch misprediction recovery completes. Additional stall scenarios, such as instruction storage 74 being full, may additionally cause assertion of stall signals 60. It is noted that exception conditions may be handled in a manner similar to branch mispredictions.

For the embodiment shown in FIG. 4, instruction storage 74 is line-oriented. In other words, a storage location as allocated and deallocated by instruction storage 74 includes sufficient storage space for instruction information pertaining to the maximum number of instructions which may be concurrently decoded by microprocessor 10. In one embodiment, instruction storage 74 includes storage locations 88A and 88B. Each storage location includes three instruction information fields (e.g. I1, I2, and I3) as well as a shared information field SH. Instruction information fields I1, I2, and I3 store information pertaining to a particular instruction. Shared information field SH stores information common to the line of instructions. In one embodiment, instruction storage 74 includes 15 storage locations 88, each capable of storing information pertaining to 3 instructions.

Instruction control unit 76 controls the operation of instruction storage 74. Instruction storage control unit 76 directs instruction storage 74 to store instruction information conveyed upon instruction buses 50 into a storage location 88. Additionally, instruction storage 74 directs the shifting of information between storage locations when instructions are retired. In one embodiment, instruction storage 74 is operated as a FIFO queue in which a particular storage location 88 is maintained as the bottom of the queue (i.e. the particular storage location 88 stores the set of concurrently decoded instructions which are foremost in program order within reorder buffer 32). As a set of instructions are retired, the entries within the FIFO queue are shifted such that the first set of concurrently decoded instructions remaining within the reorder buffer 32 are moved into the bottom storage location 88. Additionally, instruction control unit 76 assigns instruction tags to sets of concurrently decoded instructions. The tags identify the set of concurrently decoded instructions within instruction storage 74.

In one embodiment, the instruction tags do not directly identify a storage location. Instead, the instruction tag is stored within the shared field SH of the storage location 88 assigned to the instructions. Instruction control 76 compares reorder buffer tags provided upon results buses 38 and branch misprediction bus 62 to the instruction tags stored in shared field SH to determine which line of instructions are referred to by the received reorder buffer tags. Only the line tag portion of the reorder buffer tag is compared. The offset portion identifies which field within the storage location 88 to update. Instruction control unit 76 is also responsible for recovering from branch mispredictions by discarding instructions subsequent to the mispredicted branch within instruction storage 74.

Figure 5A:
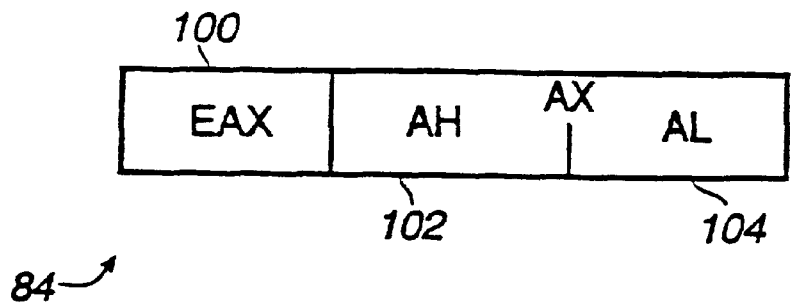
FIG. 5A is a diagram depicting one embodiment of a width field shown in FIG. 4.

Turning next to FIG. 5A, a diagram depicting the encoding of one embodiment of width field 84 of storage location 80A is shown. Other width fields 84 may be encoding similarly, and other encodings may be employed in other embodiments. The embodiment shown in FIG. 5A may be employed in embodiments of microprocessor 10 which implement the x86 microprocessor architecture. As shown in FIG. 5A, width encoding 84 includes three bits 100, 102, and 104.

Bit 100 indicates, when set, that the most significant 16 bits of the EAX register are updated by the corresponding instruction. Bit 102 indicates, when set, that the most significant eight bits of the least significant 16 bits of the EAX register are updated. Finally, bit 104 indicates, when set, that the least significant eight bits of the EAX register are updated. As appreciated by those skilled in the art, the EAX register is a 32 bit register.

The x86 microprocessor architecture defines the EAX, AX, AH, and AL portions of the EAX register. Therefore, the valid width encodings indicate one of these portions in the present embodiment. Listing the encodings from left to right as bits 100, 102, and 104, respectively, the valid encodings for each register are: (i) EAX=111; (ii) AX=011; (iii) AH=010; and (iv) AL=001.

An alternative encoding of width field 84 is a one-hot encoding comprising 4 bits, one for each of EAX, AX, AH, and AL. The corresponding bit of the encoding is set to indicate which portion of the register is updated.

Figure 5B:
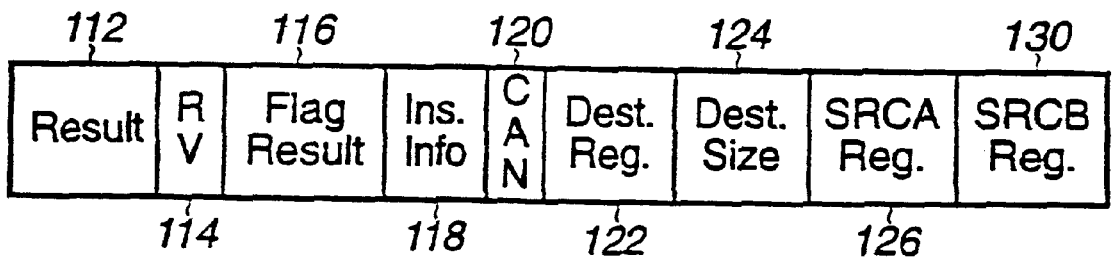
FIG. 5B is a diagram depicting instruction information stored for each instruction within the reorder buffer shown in FIG. 4.

Turning next to FIG. 5B, a diagram of one embodiment of instruction information 110 stored in each of fields I1, I2 and I3 of instruction storage locations 88 are shown. Other embodiments may store similar or dissimilar information. Information 110 includes a result field 112, a result valid bit 114, a flag result 116, an additional instruction information field 118, a cancel bit 120, a destination register identifier 122, a destination size field 124, a first source register identifier 126, and a second source register identifier 130.

Destination register identifier 122, first source register identifier 126, and second source register identifier 130 identify registers in which the destination and source operands of the instructions are stored. In order to store these values, instruction storage 74 may receive operands buses 52. Alternatively, instruction buses 50 may include these values. The register identifiers are used during branch misprediction or exception recovery. Additionally, size field 124 is used to determine the width encoding corresponding to each operand. In one embodiment, size field 124, 128, and 132 comprise the same encoding as shown in FIG. 5A.

Result field 112 stores the result generated upon execution of the instruction. Result valid bit 114, when set, indicates that the result is valid. Therefore, result valid bit 114 is examined by dependency control unit 70 to determine if the reorder buffer tag stored in dependency table 72 or the result in result field 112 of the storage location 88 corresponding to the reorder buffer tag should be forwarded upon operands/ tags buses 56 for a particular source operand. Similar to result field 112, flag result field 116 stores any flag bits which may be updated in response to execution of the instruction.

Additional instruction information field 118 stores additional instruction information which may be useful for reorder buffer 32. Additional instruction information field 118 may include, for example: a branch bit indicating, when set, that the instruction is a branch instruction; a valid bit indicating that a valid instruction is stored therein; exception status bits indicating the exception status of the instruction; a store bit indicating, when set, that the instruction includes a store memory operation; a bit indicating, when set, that the instruction updates a special register; etc.

Finally, cancel bit 120 indicates, when set, that the corresponding instruction has been canceled. An instruction may be canceled if it is subsequent to a mispredicted branch or an exception-causing instruction, for example.

Figure 5C:
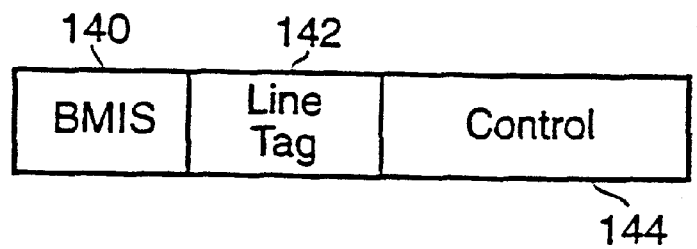
FIG. 5C is a diagram depicting instruction information stored in a shared field of a reorder buffer line.

Turning now to FIG. 5C, a diagram of one embodiment of shared field SH is shown. Shared field SH includes a branch mispredicted bit 140, a line tag field 142, and additional control information field 144. Branch mispredicted bit 140 indicates, when set, that a mispredicted branch instruction is included within the instruction storage location 88. Branch mispredicted bit 140 may be examined by dependency control unit 70 when performing misprediction recovery upon dependency table 72. Dependency control unit 70 may thereby determine when the mispredicted branch instruction has been located, and therefore when dependency table restoration is complete. Line tag field 142 stores the line tag portion of the reorder buffer tag assigned to instructions within the corresponding instruction storage 74.

Additional control information field 144 may store additional control information employed by reorder buffer 32. For example, additional control information field 144 may include: one or more program counter values identifying the instruction addresses corresponding to the instructions within the instruction storage location 88; instruction translation and cache information regarding the instructions; information regarding the existence of MROM instructions within the line, etc.

Figure 6:
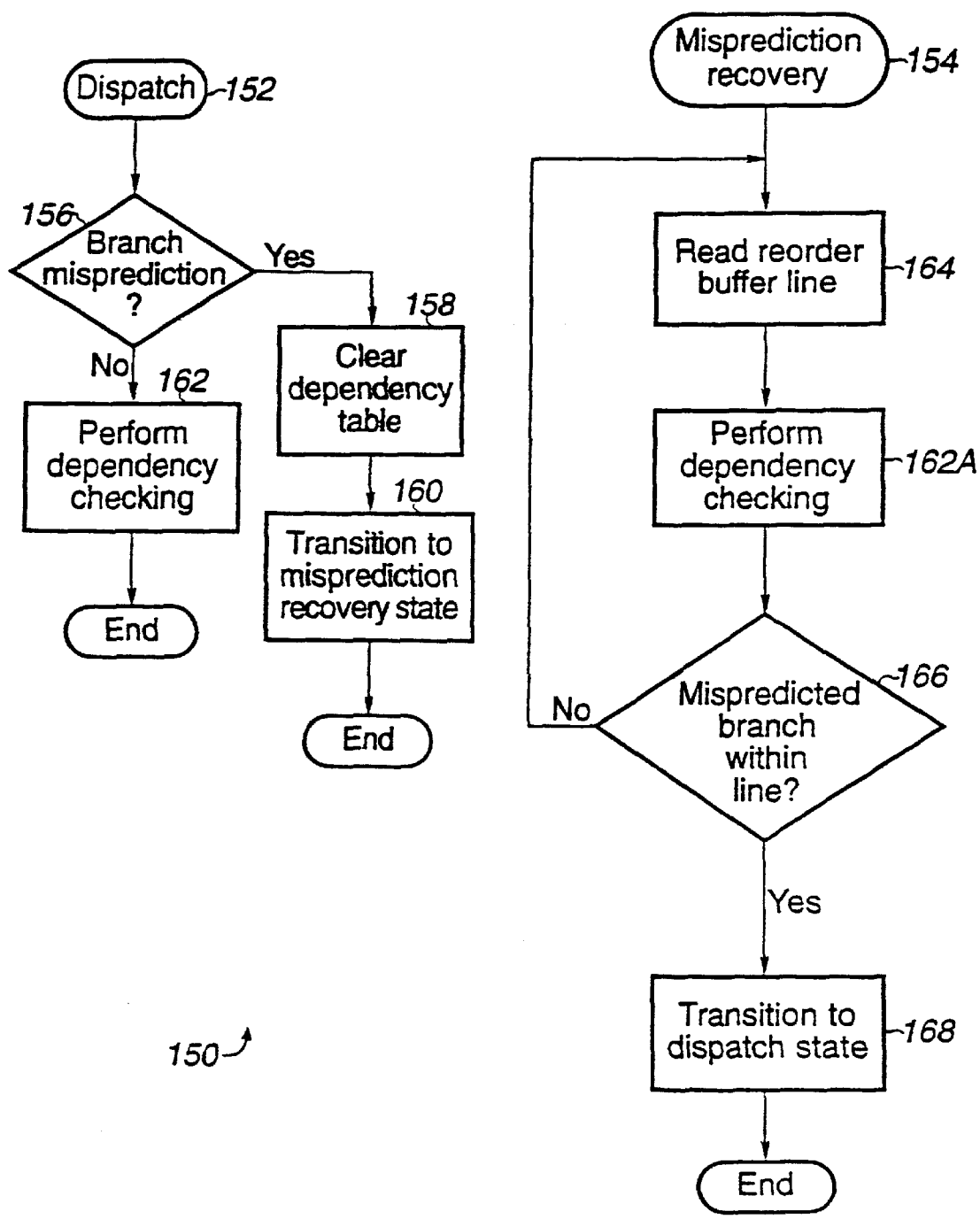
FIG. 6 is a flowchart depicting an exemplary state machine for performing branch misprediction recovery according to one embodiment of the reorder buffer shown in FIG. 4.

Turning now to FIG. 6, an exemplary state machine 150 is shown which may be employed by one embodiment of dependency control unit 70. Other embodiments of dependency control unit 70 may employ other state machines. State machine 150 includes a dispatch state 152 and a misprediction recovery state 154. It is noted that, although state machine 150 depicts steps in a serial fashion, steps may in fact be performed in parallel.

During dispatch state 152, dependency control unit 70 determines if a branch misprediction is detected by microprocessor 10 (decision box 156). If a branch misprediction is detected, dependency control unit 70 clears the state of dependency table 72 and transitions to misprediction recovery state 154 (steps 158 and 160, respectively). Dependency table 72 may be cleared by resetting the valid bit 86 corresponding to each storage location 80. Alternatively, if storage locations 80 do not include a valid bit 86, width field 84 may be set to the encoding indicating that no update of the register is outstanding. For example, the encoding shown in FIG. 5A may be set to 000 (bits 100, 102, and 104, respectively) to indicate that the storage location is not storing valid dependency information. In other words, the register corresponding to the storage location is storing the operand value. If a mispredicted branch is not detected, dependency control unit 70 performs dependency checking as described above (step 162).

During misprediction recovery state 154, dependency control unit 70 accesses a line of instruction storage 74 (step 164). Upon transition to misprediction recovery state 154, dependency control unit 70 accesses the line storing the instructions which are foremost in program order among the instruction stored in instruction storage 74 (i.e. the bottom of instruction storage 74). During subsequent clock cycles spent within misprediction recovery state 154, dependency control unit 70 accesses lines of storage within instruction storage 74 storing successive instructions in program order. Dependency control unit 70 performs dependency checking upon the instructions accessed from instruction storage 74 (e.g. step 162A, similar to step 162). Dependency control unit 70 updates dependency table 72 in accordance with the instructions accessed, but does not forward information upon operands/tags buses 56.

Additionally, dependency control unit 70 examines the mispredicted branch bit 140 stored in the accessed instruction storage location 88 (decision box 166). If the mispredicted branch instruction is stored within the accessed instruction storage location 88, then dependency control unit 70 processes the instructions prior to the mispredicted branch instruction within the accessed storage location 88 and transitions to dispatch state 152 (step 168). The instructions prior to the mispredicted branch instruction may be identified as those for which cancel bit 120 is clear, in one embodiment.

Alternatively, if the mispredicted branch instruction is not stored within the accessed instruction storage location 88, dependency control unit 70 remains in misprediction recovery state 154. During the succeeding clock cycle, another instruction storage location is accessed such that recovery of dependency table 72 may proceed.

While dependency control unit 70 is in misprediction recovery state 154, if instructions from the correct path arrive upon operands bus 52, dependency control unit 70 asserts stall signals 60. Because the same dependency checking logic is used to recover the state of dependency table 72 and to perform dependency checking upon new instructions, new instruction dispatch and recovery do not occur simultaneously. Still further, dependency table 72 must be recovered completely prior to dispatching new instructions. Otherwise, incorrect dependency information may be transmitted for the new instructions.

Figure 7:
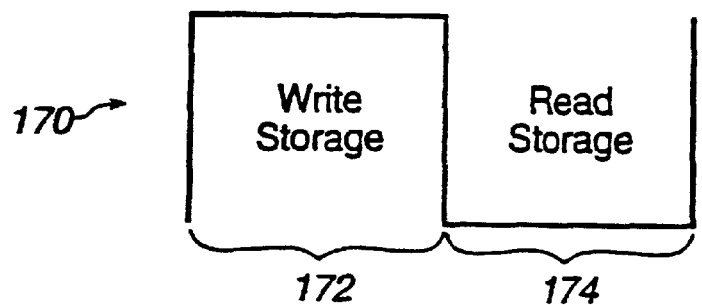
FIG. 7 is a diagram of a clock signal employed according to one embodiment of the microprocessor shown in FIG. 1.

As mentioned above, dependency control unit 70 detects narrow-to-wide dependencies and stalls instruction dispatch upon detection. In order to detect narrow-to-wide dependencies, dependency control unit 70 reads the width field 84 prior to updating dependency table 72. In one embodiment, however, microprocessor 10 updates storage arrays during the first half of a clock cycle and accesses storage arrays during the second half of the clock cycle. For example, FIG. 7 illustrates a clock signal 170. The rising edge of clock signal 170 may define the beginning of a new clock cycle. While clock signal 170 is in a logical one state (i.e. during a time period 172), storage arrays are updated. While clock signal 170 is in a logical zero state (i.e. during a time period 174), storage arrays are accessed.

Figure 8:
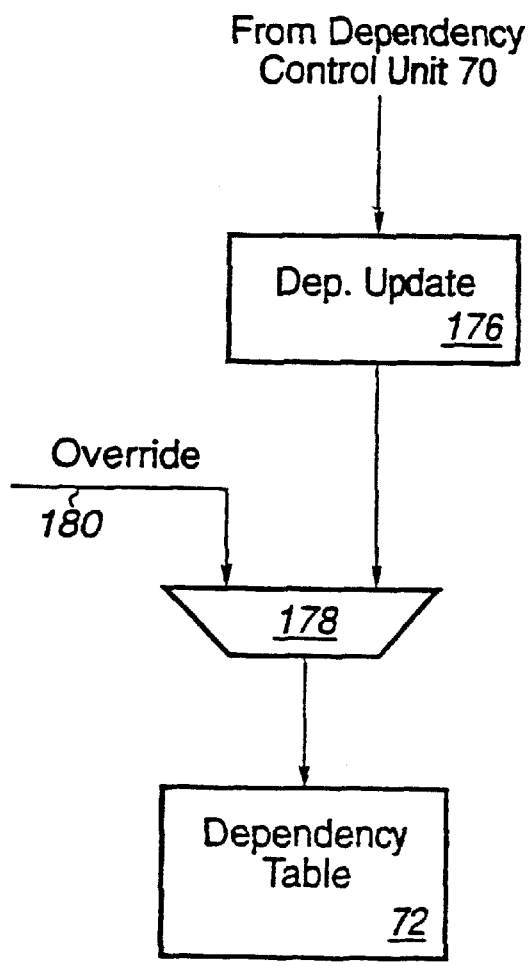
FIG. 8 is a diagram depicting hardware employed to update a dependency table included in the reorder buffer shown in FIG. 4 according to one embodiment of the dependency table.

FIG. 8 depicts a circuit which pipelines updates to dependency table 72 for embodiments of microprocessor 10 employing the write-then-read protocol for storage arrays shown in FIG. 7. The circuit shown in FIG. 8 includes a storage device 176 and a multiplexor 178. Storage device 176 stores updates for dependency table 72 created by dependency control unit 70. Dependency control unit 70 receives the data stored in dependency table 72 during a particular clock cycle, and performs dependency checking based upon this data (including narrow-to-wide dependency checking). Additionally, dependency control unit 70 generates dependency table update information based upon the destinations identified upon operands buses 52. The update information is stored into storage device 176. During time period 172 of the following clock cycle, dependency table 72 is updated with the contents of storage device 176. During time period 174, dependency table 72 is accessed and the updated contents (including the information which was previously stored in storage device 176) is available.

Multiplexor 178 is used to allow selection of override information into dependency table 72. Override path 180 may be used, for example, to clear dependency table 72 upon detection of a mispredicted branch, etc.

Figure 9:
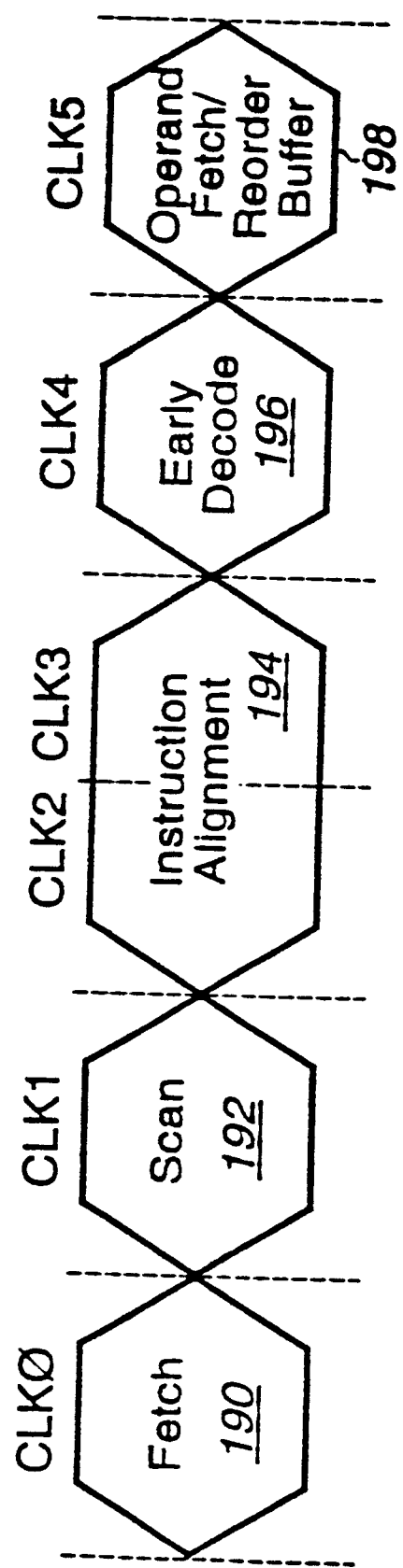
FIG. 9 is a timing diagram depicting a portion of the instruction processing pipeline according to one embodiment of the microprocessor shown in FIG. 1.

Turning next to FIG. 9, a timing diagram of stages of an instruction processing pipeline employed by one embodiment of microprocessor 10 is shown. Clock cycles are delimited by vertical dashed lines and labeled CLK0 through CLK5. During CLK0, a fetch stage 190 is performed.

Instruction cache 16 is accessed with an address provided by branch prediction unit 14. During CLK1, the fetched instructions are scanned in a scan stage 192. Scan stage 192 scans the predecode data associated with the instructions and divides the fetched instructions into groups of instructions to be operated upon by instruction alignment unit 18. Clock cycles CLK2 and CLK3 are used by instruction alignment unit 18 (instruction alignment stage 194). Instruction alignment unit 18 selects instructions from the groups of instructions provided by instruction scanning stage 192, and conveys the selected instructions to decode units 20. Decode units 20 correspond to early decode stage 196 and operand fetch/reorder buffer stage 198. Reorder buffer 32 allocates storage for the instructions during operand fetch/reorder buffer stage 198. Additionally, operand fetch and dependency checking are performed during stage 198.

When a branch misprediction occurs, instructions from the correct path enter the instruction processing pipeline at fetch stage 190. Additionally, clock cycles may elapse between detection of the mispredicted branch and the fetching instructions from the correct path in fetch stage 190. These clock cycles are used to generate the correct path address. Therefore, a microprocessor 10 employing dependency table 72 may often complete dependency table restoration prior to arrival of instructions from the correct path in stage 198. Stalls occur only when the number of lines of instructions remaining in reorder buffer 32 after discard of instructions subsequent to the mispredicted branch instruction exceeds the number of cycles needed to generate the correct path address plus the number of pipeline stages prior to operand fetch/reorder buffer stage 198. For pipelines in which several stages precede stage 198 (such as shown in FIG. 9), the stalls may not occur often enough to substantially affect performance.

Turning now to FIG. 10, an example of dependency checking operation is shown for two consecutive clock cycles. The two clock cycles are separated by a horizontal dashed line. The contents of a portion of dependency table 72 are shown as a table 210 and 212 for the two clock cycles. Table 210 depicts the contents of dependency table 72 prior to update according to a plurality of instructions 214A–214C which are decoded by early decode units 40 during the clock cycle. Similarly, table 212 depicts the contents of dependency table 72 prior to update according to a plurality of instructions 216A–216C. Instruction 214A is prior to instructions 214B–214C in program order. Similarly, instruction 214B is prior to instruction 214C in program order. Instructions 216A–216C have a similar ordering relationship with each other. In this example, the instructions in reorder buffer 32 have not yet been executed. Therefore, reorder buffer tags are forwarded when a dependency is detected.

Table 210 indicates that instructions are outstanding within reorder buffer 32 which update the EAX, EBX, and EDX registers. Reorder buffer tags 10, 11, and 12 identify the instructions. The reorder buffer tags as shown in this example are the line tag concatenated with the offset tag. Therefore, tag 10 is line 1, offset 0. Similarly tag 12 is line 1, offset 2. Additionally, width field 84 is shown in table 210. Width field 84 as shown in FIG. 10 employs the encoding shown in FIG. 5A. Finally, the valid bit is shown for each register in table 210.

Dependency control unit 70 forwards the tags shown within instructions 218A–218C based upon the information in table 210 and dependency checking between instructions 214. Instructions 218 represent the instruction and operand values/tags received by a reservation station 22. Instruction 218A corresponds to instruction 214A, etc. Since instruction 214A uses AX and BX as operands and the widths stored in table 210 indicate that at least the AX and BX portions are updated by the instructions corresponding to tags 10 and 11, respectively, tags 10 and 11 are forwarded for instruction 214A. Instruction 214B receives the value stored in the ECX register, since instructions within reorder buffer 32 do not update ECX (i.e. the valid bit for ECX is reset in table 210). Additionally, instruction 214B receives the tag 12 for the EDX register. Instruction 218B is thereby formed. Finally, since instruction 214B updates the ECX register, instruction 214C is dependent upon instruction 214B. Therefore, the reorder buffer tag 21 is provided for both source operands of instruction 218C. Instructions 218 are assigned the line tag of 2 in this example.

Table 212 is similar to table 210, but reflects the updates performed in response to instructions 214. The AX register is updated by instruction 214A (instruction tag 20, width 011), while the ECX register is updated by instruction 214C (instruction tag 22, width 111). It is noted that the ECX register is updated by instruction 214B as well. However, dependency control unit 70 stores the tag of the last of the concurrently decoded instruction to update the ECX.

Using the information in table 212, dependency checking for instructions 216 may be performed. Instruction 216A has the EAX register as an operand. However, the width of the last update to the EAX register is 011 (the AX register). Therefore, instruction 216A has a narrow-to-wide dependency. Instruction 216A and subsequent instructions 216 are stalled until instruction 214A is retired.

Figure 11:
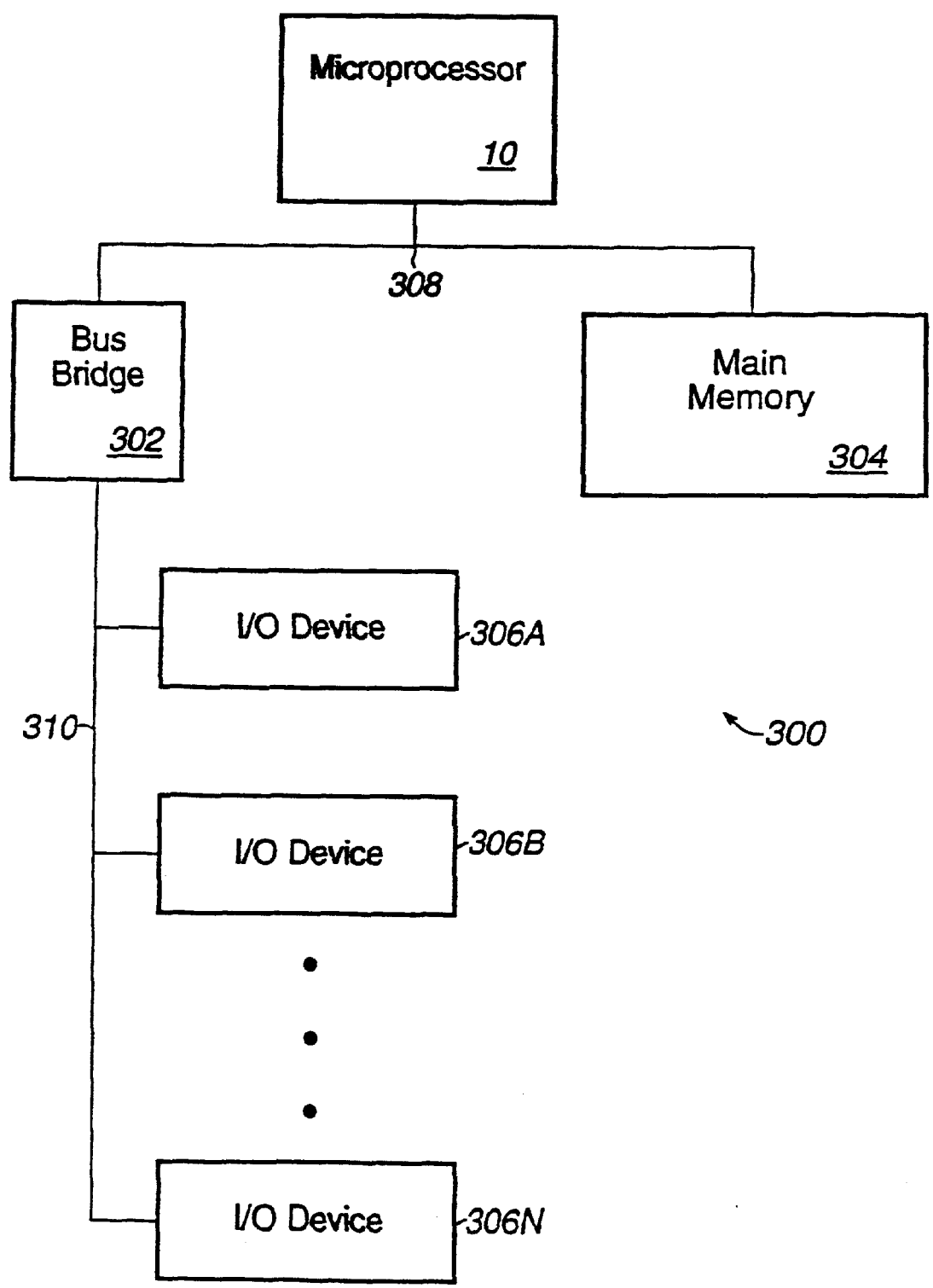
FIG. 11 is a block diagram of a computer system including the microprocessor shown in FIG. 1.

Turning now to FIG. 11, a computer system 300 including microprocessor 10 is shown. Computer system 300 further includes a bus bridge 302, a main memory 304, and a plurality of input/output (I/O) devices 306A–306N. Plurality of I/O devices 306A–306N will be collectively referred to as I/O devices 306. Microprocessor 10, bus bridge 302, and main memory 304 are coupled to a system bus 308. I/O devices 306 are coupled to an I/O bus 310 for communication with bus bridge 302.

Bus bridge 302 is provided to assist in communications between I/O devices 306 and devices coupled to system bus 308. I/O devices 306 typically require longer bus clock cycles than microprocessor 10 and other devices coupled to system bus 308. Therefore, bus bridge 302 provides a buffer between system bus 308 and input/output bus 310. Additionally, bus bridge 302 translates transactions from one bus protocol to another. In one embodiment, input/output bus 310 is an Enhanced Industry Standard Architecture (EISA) bus and bus bridge 302 translates from the system bus protocol to the EISA bus protocol. In another embodiment, input/output bus 310 is a Peripheral Component Interconnect (PCI) bus and bus bridge 302 translates from the system bus protocol to the PCI bus protocol. It is noted that many variations of system bus protocols exist. Microprocessor 10 may employ any suitable system bus protocol.

I/O devices 306 provide an interface between computer system 300 and other devices external to the computer system. Exemplary I/O devices include a modem, a serial or parallel port, a sound card, etc. I/O devices 306 may also be referred to as peripheral devices. Main memory 304 stores data and instructions for use by microprocessor 10. In one embodiment, main memory 304 includes at least one Dynamic Random Access Memory (DRAM) and a DRAM memory controller.

It is noted that although computer system 300 as shown in FIG. 11 includes one bus bridge 302, other embodiments of computer system 300 may include multiple bus bridges 302 for translating to multiple dissimilar or similar I/O bus protocols. Still further, a cache memory for enhancing the performance of computer system 300 by storing instructions and data referenced by microprocessor 10 in a faster memory storage may be included. The cache memory may be inserted between microprocessor 10 and system bus 308, or may reside on system bus 308 in a "lookaside" configuration.

Although certain embodiments of microprocessor 10 and elements thereof have been described using the x86 microprocessor architecture, it is noted that any microprocessor architecture may be employed. The apparatus and method described herein may be particularly advantageous in microprocessor architectures which allow update of various portions of a register via an instruction. Additionally, although reorder buffer 32 as shown in FIG. 4 is a line-oriented reorder buffer, any structure of reorder buffer may be used.

The term "concurrently decoded" as used herein refers to two or more instructions which are decoded during the same clock cycle. Concurrently decoded instructions are handled as a group by a line-oriented reorder buffer such as the embodiment of reorder buffer 32 shown in FIG. 4.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely; when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 xSE Fast Path, Double Dispatch, and MROM Instructions

| X86 Instruction | Instruction Category |
|---|---|
| AAA | MRCM |
| AAD | MRCM |
| AAM | MRCM |
| AAS | MRCM |
| ADC | fast path |
| ADD | fast path |
| AND | fast path |
| ARPL | MRCM |
| BCUND | MRCM |
| BSF | fast path |
| BSR | fast path |
| BSWAP | MRCM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MRCM |
| CLTS | MRCM |
| CMC | fast path |
| CMP | fast path |
| CMPS | MRCM |
| CMPSB | MRCM |
| CMPSW | MRCM |
| CMPSD | MRCM |
| CMPXCHG | MRCM |
| CMFXCHG8B | MRCM |
| CPUID | MRCM |
| CWD | MRCM |
| CWQ | MRCM |
| DDA | MRCM |
| DAS | MRCM |
| DEC | fast path |
| DIV | MRCM |
| ENTER | MROM |
| HLT | MRCM |
| IDIV | MRCM |
| IMUL | double dispatch |
| IN | MRQM |
| INC | fast path |
| INS | MRCM |
| INSB | MRCM |
| INSW | MRCM |
| INSD | MRCM |
| INT | MRCM |
| INTC | MRCM |
| INVD | MRCM |
| INVLPG | MRCM |
| IRET | MRCM |
| IRETD | MRCM |
| Jcc | fast path |
| JCXZ | double dispatch |
| JECXZ | double dispatch |
| JMF | fast path |
| LAHF | fast path |
| LAR | MRCM |
| LDS | MRCM |
| LES | MRCM |
| LFS | MRCM |
| LGS | MRCM |
| LSS | MRCM |
| LEA | fast path |
| LEAVE | double dispatch |
| LGDT | MRCM |
| LIDT | MRCM |
| LLDT | MRCM |
| LMSW | MRCM |
| LODS | MRCM |
| LCDSB | MRCM |
| LCDSW | MRCM |
| LCDSD | MRCM |
| LCCP | double dispatch |
| LCCPcond | MRCM |
| LSL | MRCM |
| LTR | MRCM |
| MCV | fast path |
| MCVCC | fast path |
| MCV.CR | MRCM |
| MCV.DR | MRCM |
| MCVS | MRCM |
| MCVSB | MRCM |
| MCVSW | MRCM |
| MCVSD | MRCM |
| MCVSX | fast path |
| MCVZX | fast path |
| MUL | double dispatch |
| NEG | fast path |
| NCP | fast path |
| NCT | fast path |
| CR | fast path |
| CUT | MRCM |
| CUTS | MRCM |
| CUTSB | MRCM |
| CUTSW | MRCM |
| CUTSD | MRCM |
| PCP | double dispatch |
| POPA | MRCM |
| FCPAD | MRCM |
| PCPF | MRCM |
| PCPFD | MRCM |
| PUSH | fast path/double dispatch |
| FUSHA | MRCM |
| PUSHAD | MRCM |
| FUSHF | fast path |
| PUSHFD | fast path |
| RCL | MRCM |
| RCR | MRCM |
| RCL | fast path |
| RCR | fast path |
| RDMSR | MRCM |
| REP | MRCM |
| REPE | MRCM |
| REPZ | MRCM |
| REPNE | MRCM |
| REPNZ | MRCM |
| RET | double dispatch |
| RSM | MRCM |
| SAHF | fast path |
| SAL | fast path |
| SAR | fast path |
| SHL | fast path |
| SHR | fast path |
| SBB | fast path |
| SCAS | double dispatch |
| SCASB | MRCM |
| SCASW | MRCM |
| SCASD | MRCM |
| SETcc | fast path |
| SGDT | MRCM |
| SIDT | MRCM |
| SHLD | MRCM |
| SHRD | MRCM |
| SLDT | MROM |
| SNSW | MRCM |
| STC | fast path |
| STD | fast path |
| STI | MRCM |
| STOS | MROM |
| STOSB | MRCM |
| STOSW | MROM |

TABLE 1-continued xSE Fast Path, Double Dispatch, and MROM Instructions

| X86 Instruction | Instruction Category |
| --- | --- |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XCR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al, now U.S. Pat. No. 5,831,462. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran, now U.S. Pat. No. 5,619,464. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt, now U.S. Pat. No. 5,623,619; "Superscalar Microprocessor Including a High Performance Instruction Alignment Unit", Ser. No. 08/377,843, filed Jan. 25, 1995 by Witt, et al, now U.S. Pat. No. 5,819,057; "A Way Prediction Structure", Ser. No. 08/522,181, filed Aug. 31, 1995 by Roberts, et al, now U.S. Pat. No. 5,845,323; "A Data Cache Capable of Performing Store Accesses in a Single Clock Cycle", Ser. No. 08/521,627, filed Aug. 31, 1995 by Witt, et al, now U.S. Pat. No. 5,860,104; "A Parallel and Scalable Instruction Scanning Unit", Ser. No. 08/475,400, filed Jun. 7, 1995 by Narayan, now U.S. Pat. No. 5,875,315; and "An Apparatus and Method for Aligning Variable-Byte Length Instructions to a Plurality of Issue Positions", Ser. No. 08/582,473, filed Jan. 2, 1996 by Tran, et al, now U.S. Pat. No. 5,822,559. The disclosure of these patent applications are incorporated herein by reference in their entirety.

In accordance with the above disclosure, a dependency table has been described which simplifies dependency checking hardware in a superscalar microprocessor. If the number of instructions which may be outstanding within the microprocessor is increased, the dependency checking hardware remains constant. Advantageously, reducing the amount of hardware reduces the area occupied by dependency checking hardware. Additional hardware for performing other functions within the microprocessor may be employed.

Numerous variations and modifications will become apparent to those skilled in the art once the above disclosure is fully appreciated. It is intended that the following claims be interpreted to embrace all such variations and modifications.

What is claimed is:

1. A reorder buffer for performing dependency checking in a microprocessor, comprising:

an instruction storage, wherein said instruction storage is configured to store information regarding a plurality of instructions;

an instruction control unit, wherein said instruction control unit is coupled to said instruction storage;

a dependency table, wherein said dependency table is coupled to said instruction storage, wherein said dependency table includes a plurality of dependency entries, wherein each of said plurality of dependency entries is assigned to a different one of a plurality of registers, wherein each of said plurality of dependency entries identifies one of said plurality of instructions represented in said instruction storage, and wherein said one of said plurality of instructions is the most recent instruction in program order to update one of said plurality of registers; and a dependency control unit, wherein said dependency control unit is coupled to said dependency table, wherein said dependency control unit is configured to detect dependencies between said set of concurrently decoded instructions and said plurality of instructions represented in said instruction storage, and wherein said dependency control unit uses one of said plurality of dependency entries to resolve dependencies between said set of concurrently decoded instructions and said plurality of instructions represented in said instruction storage.

2. The reorder buffer as recited in claim 1 wherein the number of said plurality of dependency entries is the same as the number of said plurality of registers.

3. The reorder buffer as recited in claim 2 wherein each of said plurality of dependency entries includes:

a tag field, wherein said tag field identifies said one of said plurality of instructions stored in said instruction storage; and a width field, wherein said width field identifies at least a portion of one of said plurality of registers, and wherein said width field is used to perform dependency width checking.

4. The reorder buffer as recited in claim 3 wherein each of said plurality of dependency entries includes:

a valid field, wherein said valid field indicates the validity of one of said plurality of dependency entries.

* * * * *